US012763344B2

(12) United States Patent
Haf et al.

(10) Patent No.: US 12,763,344 B2
(45) Date of Patent: Oct. 13, 2026

(54) FUEL CELL DEVICE AND METHOD FOR COOLING A FUEL CELL SYSTEM

(71) Applicant: AUDI AG, Ingolstadt (DE)

(72) Inventors: Johannes Haf, Neuburg (DE); Thomas Lichius, Gaimersheim (DE); Thomas Weustenfeld, Briarwood, NY (US); Sebastian Albl, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 588 days.

(21) Appl. No.: 17/293,019

(22) PCT Filed: Nov. 7, 2019

(86) PCT No.: PCT/EP2019/080496
§ 371 (c)(1),
(2) Date: May 11, 2021

(87) PCT Pub. No.: WO2020/099229
PCT Pub. Date: May 22, 2020

(65) Prior Publication Data

US 2021/0408561 A1 Dec. 30, 2021

(30) Foreign Application Priority Data

Nov. 12, 2018 (DE) .................... 10 2018 219 203.0

(51) Int. Cl.
*H01M 8/04029* (2016.01)
*B60H 1/00* (2006.01)
(Continued)

(52) U.S. Cl.
CPC .... *H01M 8/04029* (2013.01); *B60H 1/00278* (2013.01); *B60L 58/26* (2019.02);
(Continued)

(58) Field of Classification Search
CPC ................................................ H01M 8/04029
See application file for complete search history.

(56) References Cited

U.S. PATENT DOCUMENTS 6,383,672 B1 * 5/2002 Fujita ................ H01M 8/04029 429/442
9,136,549 B2 * 9/2015 Vollmer
(Continued)

FOREIGN PATENT DOCUMENTS

CN 107431221 A * 12/2017 ........ H01M 8/04268
DE 102010014752 A1 11/2010
(Continued)

OTHER PUBLICATIONS

"How plate-and-frame heat exchangers work," Alfa Laval, https://www.alfalaval.us/microsites/gasketed-plate-heat-exchangers/tools/how-gphes-work/. Accessed Feb. 19, 2025. (Year: 2025).*
(Continued)

*Primary Examiner* — Nicole M. Buie-Hatcher
*Assistant Examiner* — Krishna R Hammond
(74) *Attorney, Agent, or Firm* — Seed Intellectual Property Law Group LLP

(57) ABSTRACT

A fuel cell device for a vehicle has a fuel cell system comprising a fuel cell stack and has a first cooling circuit for cooling the fuel cell system and a second cooling circuit for cooling an electronic unit and/or an energy storage. The first cooling circuit and the second cooling circuit are thermally connected to each other, wherein only the second cooling circuit has a cooler for cooling the cooling water flowing in the second cooling circuit. A method for cooling a fuel cell device using such components is also provided.

8 Claims, 1 Drawing Sheet

(51) Int. Cl.

| | |
|---|---|
| ***B60L 58/26*** | (2019.01) |
| ***B60L 58/33*** | (2019.01) |
| ***H01M 8/04007*** | (2016.01) |
| ***H01M 10/613*** | (2014.01) |
| ***H01M 10/625*** | (2014.01) |
| ***H01M 10/663*** | (2014.01) |

(52) U.S. Cl.

CPC ......... *B60L 58/33* (2019.02); *H01M 8/04074* (2013.01); *H01M 10/613* (2015.04); *H01M 10/625* (2015.04); *H01M 10/663* (2015.04); *H01M 2250/20* (2013.01)

(56) References Cited

U.S. PATENT DOCUMENTS

| | | | | |
|---|---|---|---|---|
| 2004/0038100 | A1 * | 2/2004 | Cargnelli .......... | H01M 8/04156 429/414 |
| 2007/0077473 | A1 * | 4/2007 | Schwab ............ | H01M 8/04225 429/435 |
| 2009/0130513 | A1 * | 5/2009 | Tsuchiya .................. | B60K 1/04 429/412 |
| 2011/0177416 | A1 * | 7/2011 | Suematsu | |
| 2013/0022888 | A1 | 1/2013 | Vollmer et al. | |
| 2016/0141680 | A1 * | 5/2016 | Yamada | |
| 2017/0158081 | A1 | 6/2017 | Kim et al. | |
| 2017/0263953 | A1 * | 9/2017 | Ohira ................... | B01D 15/361 |
| 2019/0047365 | A1 * | 2/2019 | Sonnekalb | |

FOREIGN PATENT DOCUMENTS

| | | | |
|---|---|---|---|
| DE | 102011076737 | A1 | 12/2012 |
| DE | 102015015635 | A1 | 6/2017 |
| DE | 102016114948 | A1 | 2/2018 |
| EP | 3444135 | A1 | 2/2019 |
| FR | 2927470 | A1 | 8/2009 |

OTHER PUBLICATIONS

International Search Report, mailed Feb. 24, 2020, for International Application No. PCT/EP2019/080496, 4 pages.

International Preliminary Report on Patentability, dated Apr. 29, 2021, for International Application No. PCT/EP2019/080496, 4 pages.

* cited by examiner

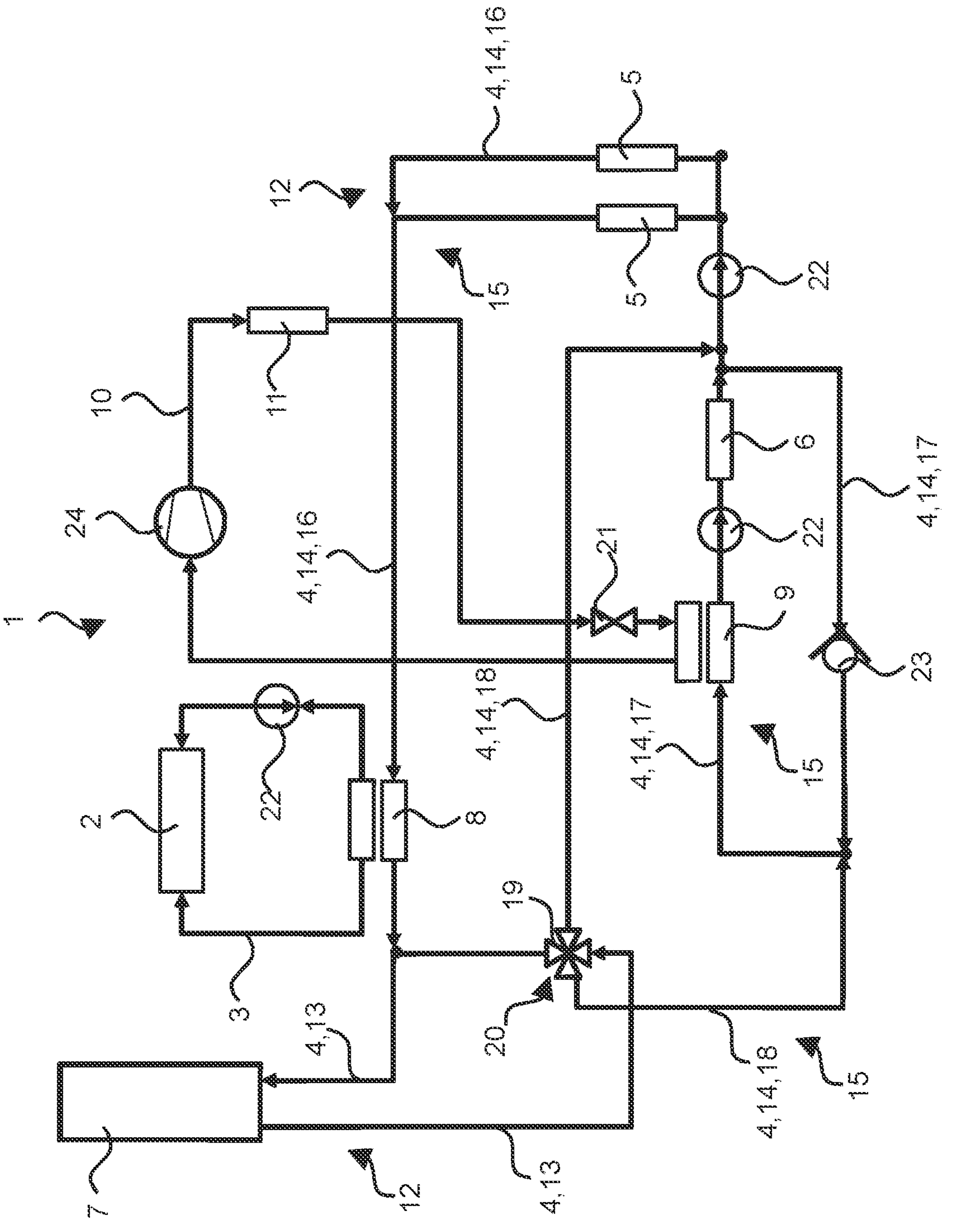
1
2
3
4,13
4,13
5
5
6
7
8
9
10
11
12
12
15
15
15
19
20
21
22
22
22
23
24
4,14,16
4,14,16
4,14,17
4,14,17
4,14,18
4,14,18

FUEL CELL DEVICE AND METHOD FOR COOLING A FUEL CELL SYSTEM

BACKGROUND

Technical Field

Embodiments of the invention relate to a fuel cell device for a vehicle with a fuel cell system having a fuel cell stack and with a cooling circuit for cooling the fuel cell system, as well as with a second cooling circuit for cooling an electronic unit and/or an energy storage, wherein the first cooling circuit and the second cooling circuit are thermally connected to one another.

Description of the Related Art

Fuel cells serve to provide electrical energy in an electrochemical reaction that can be used, for example, to operate a motor vehicle, for example to supply the drive train, which comprises at least one electronic unit and at least one energy storage formed as a battery. A fuel cell system thereby comprises a plurality of fuel cells combined in a fuel cell stack, to which cathode gas, such as air, is supplied on the cathode side via a compressor that can be driven by means of a compressor motor, and fuel, such as hydrogen, is supplied on the anode side from a fuel storage device. The fuel cell system may also comprise a humidifier for humidifying the cathode gas to be supplied.

Usually, both the fuel cell system and the energy storage and the electronic unit must be cooled in order to prevent overheating and thus damage to the same. For this, separate cooling circuits are provided in the prior art, so that a comparatively large installation space has to be provided for the fuel cell device comprising the individual cooling circuits.

U.S. Pat. No. 9,136,549 B2 shows such a fuel cell device which has separate cooling circuits for the fuel cell system and for the electronic unit or the energy storage, wherein the cooling circuits are thermally connected to one another.

Furthermore, the coolant used to cool the fuel cells of the fuel cell system must have a very low conductivity in order to avoid a short circuit within the fuel cell. In addition, there is a risk that body parts will also become conductive due to a conductive coolant. Even though coolants with a very low conductivity can be produced, the coolant nevertheless becomes conductive again due to the discharge of ions from the components in contact with the coolant during vehicle operation. Therefore, in order to reduce the introduction of ions into the coolant, considerable measures have to be taken, for example rinsing the individual components or special, cost-intensive materials have to be used. In particular, the rinsing of the individual components is an enormous effort, as a plurality of individual components have to be rinsed, the rinsed components have to be stored and transported under very clean conditions and the components have to be assembled into an overall cooling system without contamination.

BRIEF SUMMARY

The present disclosure describes a fuel cell device of the type mentioned at the beginning and a method for cooling a fuel cell device which reduce the above-mentioned disadvantages.

In particular, only the second cooling circuit has a cooler for cooling water flowing in the second cooling circuit, dispensing with a separate cooler in the first cooling circuit. The first cooling circuit is therefore cooler free. This enables the first cooling circuit for cooling the fuel cell system to be reduced to a comparatively small size, so that less installation space is required for the first cooling circuit and thus also for the fuel cell device. Furthermore, weight is saved and the fuel cell device is thereby more effective or more powerful.

The first cooling circuit and the second cooling circuit may be thermally connected by means of a heat exchanger to transfer the waste heat produced in the first cooling circuit by the fuel cell system to the second cooling circuit at a first temperature level. In particular, it is provided that the heat exchanger is formed as a water-water heat exchanger. A water-water heat exchanger is designed to be smaller than the water-air front-end cooler usually used, i.e., the surface in contact with the coolant is smaller with a water-water heat exchanger, so that the entry of ions into the coolant is reduced.

In order to be able to optimally use the waste heat generated by the fuel cell system and by the electronic unit and/or the energy storage, an air conditioning circuit, which is thermally connected to the second cooling circuit by means of a second heat exchanger, is provided to transfer the waste heat produced in the first cooling circuit and in the second cooling circuit to the air conditioning circuit at a second temperature level that is increased with respect to the first temperature level. This enables to use both the waste heat from the fuel cell system and the waste heat from the electronic unit and/or the energy storage for the air conditioning circuit. In other words, the waste heat produced by the fuel cell system and the waste heat produced by the energy storage and/or the electronic unit can be transferred to the air conditioning circuit by means of the second heat exchanger, so that heat can be withdrawn from the coolant in the second cooling circuit at a high temperature level and the respective components can be cooled further in the first or second cooling circuit. Furthermore, the second heat exchanger may be formed as a chiller.

In particular, it is provided in this context that the air conditioning circuit has a third heat exchanger for increasing the temperature of a vehicle interior. The fuel cell device may thereby be part of a vehicle. Compared to the prior art, this has the advantage that not only the waste heat produced by the fuel cell system is used to heat a vehicle interior, but also the waste heat produced by the electronic unit and/or the energy storage. This means that the transfer of heat to the air conditioning circuit from the second cooling circuit takes place at a much higher temperature level than in the prior art, so that additional electrical heating or an additional electrical heater for the vehicle interior can be foregone. The third heat exchanger may thereby be formed as a heating register.

In order to ensure an effective regulation, i.e., optimal cooling of the fuel cell system, of the electronic unit and/or of the energy storage, it is provided that the second cooling circuit comprises several subcircuits, that the subcircuits are flow-connected to one another at an opening point, and that the mass flow of the cooling water in the subcircuits is regulated by means of an actuator arranged at the opening point or coupled into it. The actuator may be formed as a multivalve, so that precisely one actuator is required for regulating the mass flows in the subcircuits while foregoing further actuators.

In this context, the subcircuits may be formed as a cooler circuit and as a drive circuit leading to the electronic unit and/or to the energy storage. The drive circuit thereby comprises several sub-circuits flow-connected to one another, wherein the sub-circuits are formed as an energy storage circuit for cooling the energy storage, and as an electronic unit circuit for cooling the electronic unit, as well as a connection circuit connecting the energy storage circuit and the electronic unit circuit to one another in flow connection. The arrangement of the subcircuits and sub-circuits corresponds in principle to the arrangement of separate cooling circuits known from the prior art, so that retrofitting the cooling circuits, i.e., foregoing an additional cooler in the first cooling circuit, establishing a thermal connection between the first cooling circuit and the second cooling circuit and between the second cooling circuit and the air conditioning circuit is possible in a simple manner. In doing so, the heat exchanger may thermally connect the electronic unit circuit to the first circuit, while the second heat exchanger may thermally connect the energy storage circuit to the air conditioning circuit.

In order to increase the power generated by the fuel cell system, several electronic units may be provided, wherein these electronic units are connected in the electronic unit circuit in a parallel flow-mechanical manner.

The method for cooling a fuel cell device comprises in particular the following steps:

- transfer of the waste heat produced in the fuel cell system from the first cooling circuit to the second cooling circuit by means of the heat exchanger at a first temperature level and thereby heating the coolant circulating in the second cooling circuit.

This makes it possible to provide a method for cooling the fuel cell system, in which the first cooling circuit is designed to be comparatively small, while foregoing an own cooler, and the waste heat produced by the fuel cell system can nevertheless be dissipated. The advantages of the fuel cell device can also be applied to the corresponding method.

For optimal use of the waste heat generated by the fuel cell system and by the electronic unit and/or by the energy storage, as well as to improve the cooling in the first cooling circuit and in the second cooling circuit, the method also comprises the following steps:

- transfer of the heat generated by the electronic unit and/or by the energy storage, as well as by the heat transfer from the first fuel cell system from the second cooling circuit to the air conditioning circuit at a second temperature level higher with respect to the first temperature level and thereby heating a refrigerant circulating in the air conditioning circuit, and
- transfer of the heat from the heated refrigerant to air located in a vehicle interior by means of the third heat exchanger and thereby raising a temperature in the vehicle interior from a first temperature value to a second temperature value increased with respect to the first temperature value.

Consequently, the waste heat generated by the fuel cell system and by the electronic unit and/or the energy storage can be transferred from the second circuit to the air conditioning circuit. Due to the additional transfer of the waste heat generated by the electronic unit and/or the energy storage to the air conditioning circuit compared to the prior art, heat transfer takes place at a comparatively high temperature level, so that, for heating a vehicle interior, an electronic heating in addition to heat transfer from the air conditioning circuit to the vehicle interior can be foregone.

BRIEF DESCRIPTION OF THE SEVERAL VIEWS OF THE DRAWINGS

Further advantages, features and details are provided in the claims, the following description and the drawing.

FIG. 1 illustrates a schematic representation of the fuel cell device with the first cooling circuit, the second cooling circuit, and the air conditioning circuit.

DETAILED DESCRIPTION

FIG. 1 shows a fuel cell device 1 for a vehicle with a fuel cell system 2 having a fuel cell stack and with a first cooling circuit 3 for cooling the fuel cell system 2, as well as with a second cooling circuit 4 for cooling an electronic unit 5 and/or an energy storage 6, wherein the first cooling circuit 3 and the second cooling circuit 4 are thermally connected to one another. In doing so, only the second cooling circuit 4 has a cooler 7 for cooling cooling water flowing in the second cooling circuit 4. In contrast, the first cooling circuit 3 is formed cooler-free, i.e., a separate cooler in the first cooling circuit 3 is foregone.

The first cooling circuit 3 and the second cooling circuit 4 are thermally connected by means of a heat exchanger 8, which is formed as a water-water heat exchanger. By means of the heat exchanger 8, the waste heat produced in the first cooling circuit 3 by the fuel cell system 2 can be transferred to the second cooling circuit 4 at a first temperature level. The cooling water circulating in the first cooling circuit 3 is thereby conveyed by a pump 22. By forming the heat exchanger 8 as a water-water heat exchanger, the entry of ions in the first cooling circuit 3 is reduced by omitting a water-air front-end cooler normally used, as a water-water heat exchanger has a significantly smaller surface in contact with the coolant.

The second cooling circuit 4 comprises several subcircuits 12. In the present embodiment, the subcircuits 12 are formed as a cooling circuit 13, in which the coolant is guided from the cooler 7 and to the cooler 7, thus circulates around the cooler 7, and is formed as a drive circuit 14 leading to the electronic unit 5 and the energy storage 6. The two subcircuits 12 thereby open into one another at an opening point 20, wherein an actuator 19 is arranged at the opening point 20 or is coupled into it. Thus, the mass flow of the cooling water in the respective subcircuits 12 and thereby the cooling of the energy storage 6 and the electronic unit 5 can be regulated. The actuator 19 is thereby formed as a multivalve, so that exactly one actuator 19 formed as a multivalve is sufficient for regulating the mass flows in the subcircuits 12, while foregoing further actuators in the subcircuits 12.

The drive circuit 14 thereby comprises several sub-circuits 15 that are flow-connected to one another. The subcircuits 15 are thereby formed as an energy storage circuit 17 for cooling the energy storage 6 and as an electronic unit circuit 16 for cooling the electronic unit 6, as well as a connection circuit 18 connecting the energy storage circuit 17 and the electronic unit circuit 16 to one another in flow connection. By means of this arrangement of subcircuits and sub-circuits, the fuel cell device, in particular the first cooling circuit 3, can be retrofitted or converted easily. In the present embodiment, the heat exchanger 8 thermally connects the first cooling circuit 3 to the electronic unit circuit 16. The actuator 19 is arranged at the opening point 20 between the second cooling circuit 4 and the connection circuit 18. Downstream of the heat exchanger 8, the electronic unit circuit 16 is connected to the cooler circuit 13 in a flow-mechanical manner.

Furthermore, an air conditioning circuit 10 thermally connected to the second cooling circuit 4 by means of a second heat exchanger 9 is provided for transferring the waste heat produced in the first cooling circuit 3 and in the second cooling circuit 4 to the air conditioning circuit 10 at a second temperature level that is increased with respect to the first temperature level. In the present embodiment, the second heat exchanger 9 is formed as a chiller which thermally connects the energy storage circuit 17 to the air conditioning circuit 10. In the present embodiment, the air conditioning circuit 10 is also cooler-free, i.e., formed without a further cooler 7. The air conditioning circuit 10 also comprises a compressor 24, an evaporator not shown in detail, expansion valves and a condenser. To control the mass flow in the air conditioning circuit 10, a second actuator 21 is also provided, which may be formed as a controllable throttle valve.

The energy storage circuit 17 furthermore comprises a pump 22 arranged or coupled downstream of the second heat exchanger 9 for conveying the coolant within the energy storage circuit 17. In addition, a check valve 23 is arranged in the energy storage circuit 17 downstream of the pump 22 or is coupled into it in order to prevent a backflow of the coolant.

In the present embodiment, two electronic units 5 are provided, which are connected in parallel in the second cooling circuit 4, more precisely in the electronic unit circuit 16 of the drive circuit 14.

The method for cooling the fuel cell device thereby comprises the following steps: Initially, the waste heat produced in the fuel cell system 2 from the first cooling circuit 3 is transferred to the second cooling circuit 4 by means of the heat exchanger 8 at a first temperature level and thereby the coolant circulating in the second cooling circuit 4 is heated. The heat is thereby withdrawn from the coolant in the first cooling circuit 3 and this is cooled thereby. Furthermore, the coolant already heated by the fuel cell system 2 is further heated by the waste heat produced by the electronic units 5 and the energy storage 6. By means of the second heat exchanger 9, the heat generated by the electronic units 5 and the energy storage 6 and by the heat transfer from the first fuel cell system 2 is transferred from the second cooling circuit 4 to the air conditioning circuit 10 at a second temperature level higher compared to first temperature level. As a result, the refrigerant circulating in the air conditioning circuit 10 is heated in that the heat is withdrawn from the coolant of the second cooling circuit 4 and the coolant in the second cooling circuit 4 is cooled thereby. The heated refrigerant of the air conditioning circuit 10 is in turn used to transfer heat by means of the third heat exchanger 11 to air located in the vehicle interior, so that the temperature in the vehicle interior is raised from a first temperature value to a second temperature value that is increased with respect to the first temperature value. Consequently, heating of the vehicle interior takes place only by the waste heat generated by the fuel cell system, the electronic unit, and the energy storage and does not require any additional electrical heating.

In doing so, the advantage of the present fuel cell device 1 and the corresponding method is that the first cooling circuit 3 for cooling the fuel cell system 2 can be designed very small and only includes the heat exchanger 8 and the pump 22. An additional cooler 7 can be foregone, so that the installation space to be provided for the fuel cell device 1 can be reduced. By means of the thermal connection of the air conditioning circuit 10 to the second cooling circuit 4, heat transfer can take place from the second cooling circuit 4 to the air conditioning circuit 10 at a comparatively high temperature level. In contrast to the prior art, not only the waste heat generated by the fuel cell system 2, but also the waste heat generated by the energy storage 6 and the electronic units 5 is transferred to the air conditioning circuit 10 by means of the second heat exchanger 9. Additional electrical heating can be dispensed with, as the heat transfer takes place at a significantly higher temperature level compared to the prior art. At the same time, due to the improved dissipation of the waste heat generated by the fuel cell system 2, by the electronic units 5 and by the energy storage 6, it is better possible to cool the corresponding components. In that the air conditioning circuit 10 is thermally connected to the second cooling circuit 4 and not to the first cooling circuit 3, the first cooling circuit can be designed much smaller. An otherwise usual heating heat exchanger in the first cooling circuit 3 can be foregone. Due to the omission of a further cooler 7 in the first cooling circuit 3, the entry of ions into the coolant is also reduced, as the water-water heat exchanger is much smaller and therefore has a smaller surface in contact with the coolant than the water-air front-end cooler usually built into the first cooling circuit 3.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A fuel cell device for a vehicle including a fuel cell system, comprising:

a first cooling circuit including a fuel cell stack and having a first coolant medium flowing therethrough during operation for cooling the fuel cell stack;

a second cooling circuit including a cooler that is configured to cool a second coolant medium flowing therethrough during operation for cooling an electronic unit and an energy storage of the vehicle, the second cooling circuit including a plurality of sub-circuits that are flow connected to one another including a cooler circuit, in which the second coolant medium is guided to and from the cooler, and a drive circuit, in which the second coolant medium is guided to and from the electronic unit and the energy storage, and wherein the drive circuit has a plurality of sub-circuits that are flow connected to one another including an electronic unit circuit for cooling the electronic unit, an energy storage circuit for cooling the energy storage, and a connection circuit that connects the electronic unit circuit and the energy storage circuit together such that the second coolant medium of the second cooling circuit flows through each of the cooler, the electronic unit and the energy storage during operation; and an air conditioning circuit to condition air of an interior of the vehicle, wherein the first cooling circuit and the second cooling circuit are thermally connected to one another by a first heat exchanger such that during operation heat from the fuel cell stack is transferred from the first coolant medium of the first cooling circuit to the second coolant medium of the second cooling circuit, which flows through each of the cooler, the electronic unit and the energy storage device during operation, wherein the second cooling circuit and the air conditioning circuit are thermally connected to one another by a second heat exchanger and configured such that heat absorbed from cooling the electronic unit and the energy storage during operation can be transferred from the second cooling circuit to the air conditioning circuit and used to heat the air of the interior of the vehicle, wherein the first cooling circuit and the air conditioning circuit are not directly thermally connected to one another, wherein the first cooling circuit is cooler-free such that the first cooling circuit is not fluidically coupled to the cooler of the second cooling circuit or any other cooler to preclude the first coolant medium flowing through the first cooling circuit during operation from flowing through any cooler, wherein the first cooling circuit lacks an electronic unit requiring heat generated thereby to be dissipated by the first cooling circuit, and wherein the first cooling circuit consists only of the fuel cell stack, the first heat exchanger, and a pump to reduce installation space required for the first cooling circuit, including the fuel cell stack.

2. The fuel cell device according to claim 1, wherein the first cooling circuit and the second cooling circuit are thermally connected by the first heat exchanger for transferring waste heat produced in the first cooling circuit through the fuel cell system to the second cooling circuit at a first temperature level.

3. The fuel cell device according to claim 2, wherein the first heat exchanger is a water-water heat exchanger.

4. The fuel cell device according to claim 2, wherein the air conditioning circuit is thermally connected to the second cooling circuit by the second heat exchanger for transferring waste heat produced in the first cooling circuit and in the second cooling circuit to the air conditioning circuit at a second temperature level that is increased with respect to the first temperature level.

5. The fuel cell device according to claim 4, wherein the air conditioning circuit has a third heat exchanger for increasing the temperature of a vehicle interior.

6. The fuel cell device according to claim 1, wherein the plurality of sub-circuits are flow-connected to one another at an opening point, and the mass flow of the second coolant medium in the subcircuits can be regulated by an actuator arranged at the opening point or coupled into it.

7. A method for cooling a fuel cell device in a vehicle including a fuel cell system, the fuel cell device including:

a first cooling circuit including a fuel cell stack and having a first coolant medium flowing therethrough during operation for cooling the fuel cell stack;

a second cooling circuit including a cooler that is configured to cool a second coolant medium flowing therethrough during operation for cooling an electronic unit and an energy storage of the vehicle, the second cooling circuit including a plurality of sub-circuits that are flow connected to one another including a cooler circuit, in which the second coolant medium is guided to and from the cooler, and a drive circuit, in which the second coolant medium is guided to and from the electronic unit and the energy storage, and wherein the drive circuit has a plurality of sub-circuits that are flow connected to one another including an electronic unit circuit for cooling the electronic unit, an energy storage circuit for cooling the energy storage, and a connection circuit that connects the electronic unit circuit and the energy storage circuit together such that the second coolant medium of the second cooling circuit flows through each of the cooler, the electronic unit and the energy storage during operation; and an air conditioning circuit to condition air of an interior of the vehicle, wherein the first cooling circuit and the second cooling circuit are thermally connected to one another by a first heat exchanger such that during operation heat from the fuel cell stack is transferred from the first coolant medium of the first cooling circuit to the second coolant medium of the second cooling circuit, which flows through each of the cooler, the electronic unit and the energy storage device during operation, wherein the second cooling circuit and the air conditioning circuit are thermally connected to one another by a second heat exchanger and configured such that heat absorbed from cooling the electronic unit and the energy storage during operation can be transferred from the second cooling circuit to the air conditioning circuit and used to heat the air of the interior of the vehicle, wherein the first cooling circuit and the air conditioning circuit are not thermally connected to one another, wherein the first cooling circuit is cooler-free such that the first cooling circuit is not fluidically coupled to the cooler of the second cooling circuit or any other cooler to preclude the first coolant medium flowing through the first cooling circuit during operation from flowing through any cooler, wherein the first cooling circuit lacks an electronic unit requiring heat generated thereby to be dissipated by the first cooling circuit, wherein the first cooling circuit consists only of the fuel cell stack, the first heat exchanger, and a pump to reduce installation space required for the first cooling circuit, including the fuel cell stack, and wherein the method comprises transferring waste heat produced in the fuel cell system from the first cooling circuit to the second cooling circuit by the first heat exchanger at a first temperature level and thereby heating the second coolant medium circulating in the second cooling circuit.

8. The method according to claim 7, further comprising:

transferring heat generated by the electronic unit and the energy storage, as well as by the heat transfer from the first cooling circuit of the fuel cell device, from the second cooling circuit to the air conditioning circuit at a second temperature level higher with respect to the first temperature level and thereby heating a refrigerant circulating in the air conditioning circuit; and transferring heat from the heated refrigerant to the air located in the interior of the vehicle by a third heat exchanger and thereby raising a temperature in the interior of the vehicle.

* * * * *